US012693584B2

(12) United States Patent
Rohrbach

(10) Patent No.: US 12,693,584 B2
(45) Date of Patent: Jul. 28, 2026

(54) MOTION SENSING MOUNT APPARATUS FOR A CAMERA

(71) Applicant: Gray Rohrbach, Dolan Springs, AZ (US)

(72) Inventor: Gray Rohrbach, Dolan Springs, AZ (US)

( * ) Notice: Subject to any disclaimer, the term of this patent is extended or adjusted under 35 U.S.C. 154(b) by 179 days.

(21) Appl. No.: 18/803,315

(22) Filed: Aug. 13, 2024

(65) Prior Publication Data

US 2026/0050205 A1 Feb. 19, 2026

(51) Int. Cl.
| | |
|---|---|
| *H04N 5/335* | (2011.01) |
| *F16M 11/06* | (2006.01) |
| *F16M 11/18* | (2006.01) |
| *G03B 17/56* | (2021.01) |

(52) U.S. Cl.
CPC .......... *G03B 17/561* (2013.01); *F16M 11/06* (2013.01); *F16M 11/18* (2013.01)

(58) Field of Classification Search
CPC .................................................. G03B 17/561
See application file for complete search history.

(56) References Cited

U.S. PATENT DOCUMENTS

| | | | |
|---|---|---|---|
| 9,253,376 | B2 | 2/2016 | Boyle |
| 11,122,210 | B2 | 9/2021 | Qian |
| 11,412,149 | B1 | 8/2022 | Gandhi |
| 11,743,589 | B2 | 8/2023 | Antonini |
| 2015/0334311 | A1 | 11/2015 | Paz |
| 2021/0360161 | A1 | 11/2021 | Reed |

*Primary Examiner* — Gary C Vieaux

(57) ABSTRACT

A motion sensing mount apparatus for mounting to a building corner, tree, or the like and directing a camera toward a source of detected motion includes a structure mounting bracket which mounts to a support structure. A support module is removably coupled to and extending away from the structure mounting bracket. A camera is movably mounted atop the support module via a turntable or the like. Motion sensors detect motion and a direction from which the motion occurred relative to the camera. A drive mechanism is operable to rotate the turntable to direct the camera toward the source of the motion.

20 Claims, 10 Drawing Sheets

MOTION SENSING MOUNT APPARATUS FOR A CAMERA

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to motion-sensing apparatuses and more particularly pertains to a new motion-sensing apparatus for mounting to a building corner, tree, or the like and directing a camera toward a source of detected motion.

(2) Description of Related Art Including Information Disclosed Under 37 CFR 1.97 and 1.98

Various motion sensing camera devices are disclosed by the prior art. However, the prior art fails to describe a mounting apparatus which may be used to convert a stationary camera into a motion-tracking camera and mount the camera to a support structure.

BRIEF SUMMARY OF THE INVENTION

An embodiment of the disclosure meets the needs presented above by generally comprising a structure mounting bracket which has a front portion and an engagement portion. The engagement portion is attached to a rear side of the front portion and defines a cavity opposite the front portion which is shaped and configured to conform to a support structure. A connector is provided which is configured to secure the structure mounting bracket to the support structure such that the support structure is positioned within the cavity of the engagement portion.

A support module is mounted to the front portion of the structure mounting bracket, and a turntable is rotatably mounted atop the support module. The turntable is configured to support a camera. A drive mechanism is operatively coupled to the turntable, and a processor is operatively coupled to the drive mechanism. A motion sensor assembly is mounted to the support module. The processor is configured to detect motion and a direction from which the motion originates relative to the turntable via the motion sensor assembly. The processor is programmed and configured to orient the camera via the drive mechanism in a direction where motion was detected via the motion sensor assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
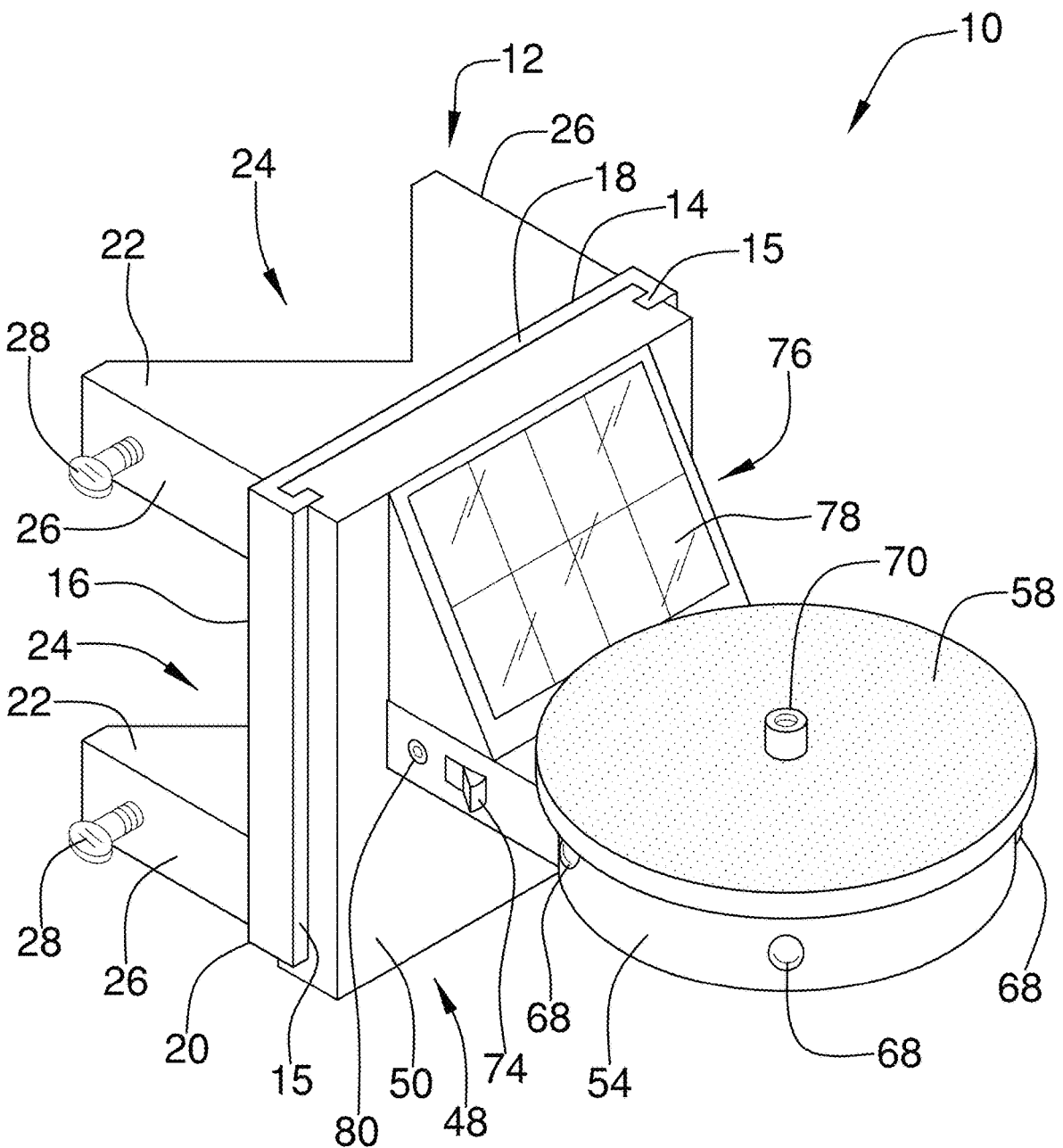
FIG. 1 is a front perspective view of a motion sensing mount apparatus according to an embodiment of the disclosure.
Figure 2:
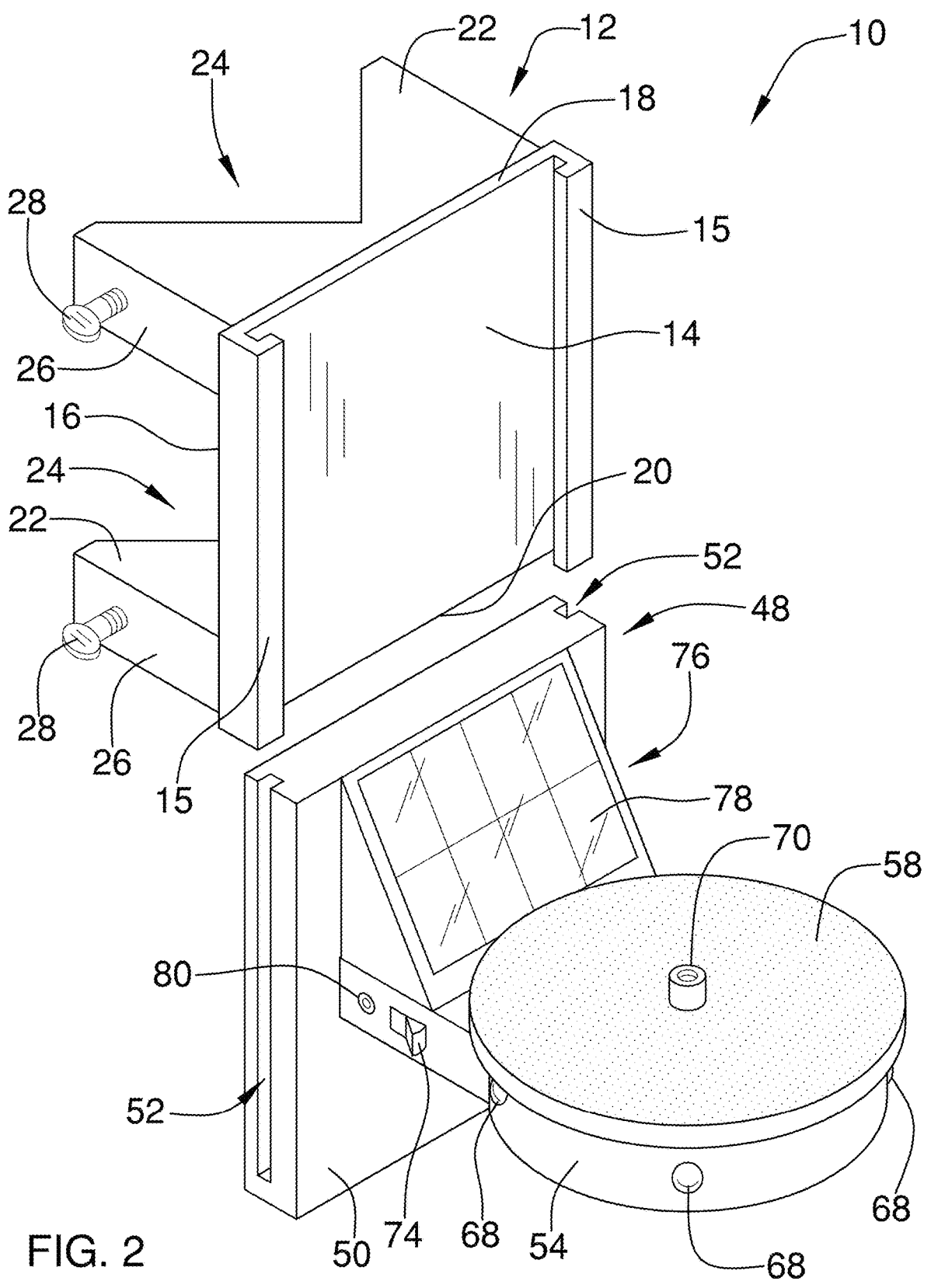
FIG. 2 is an exploded front perspective view of an embodiment of the disclosure.
Figure 3:
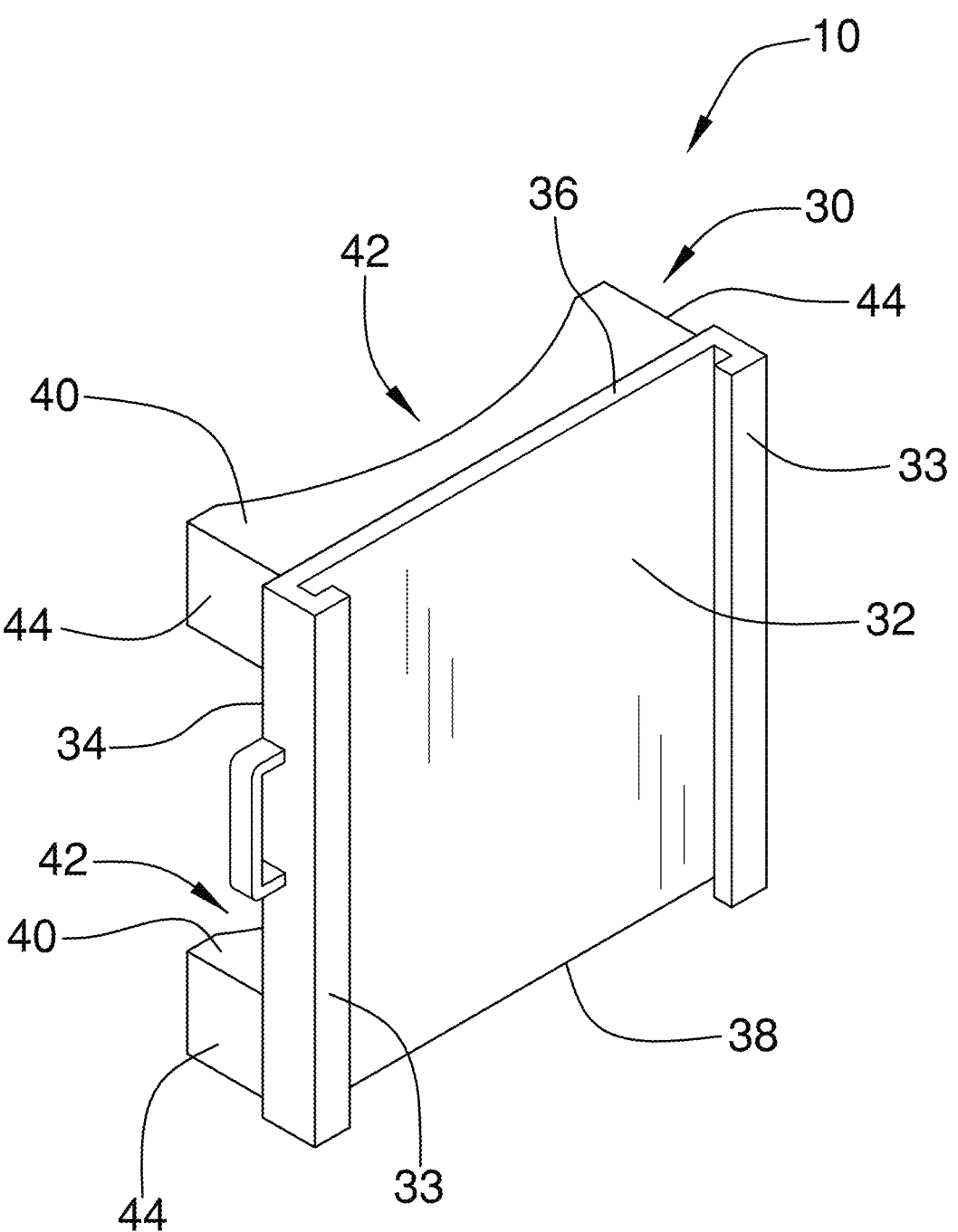
FIG. 3 is a front perspective view of a structure mounting bracket of an embodiment of the disclosure.
Figure 4:
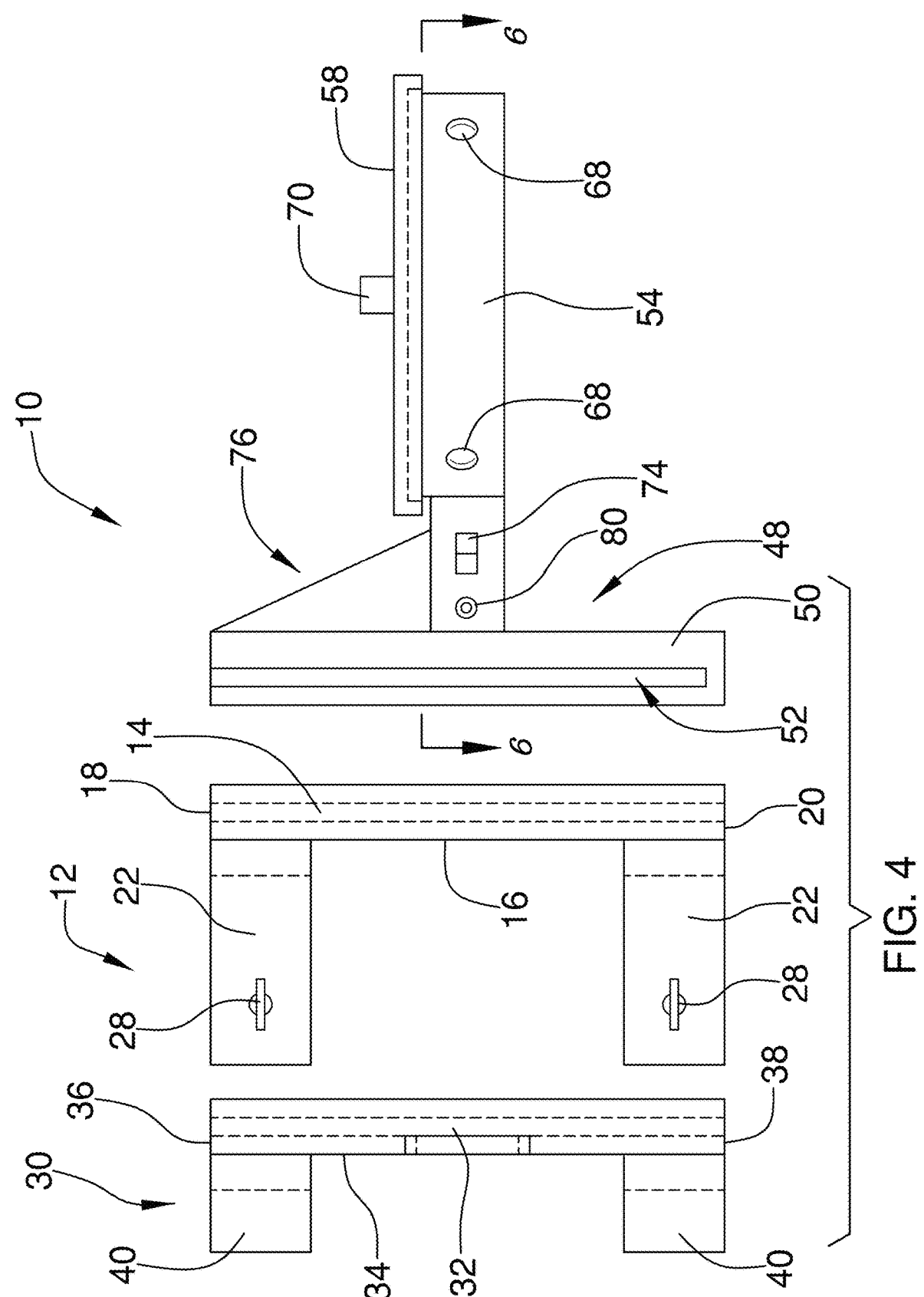
FIG. 4 is a side kit view of an embodiment of the disclosure.
Figure 5:
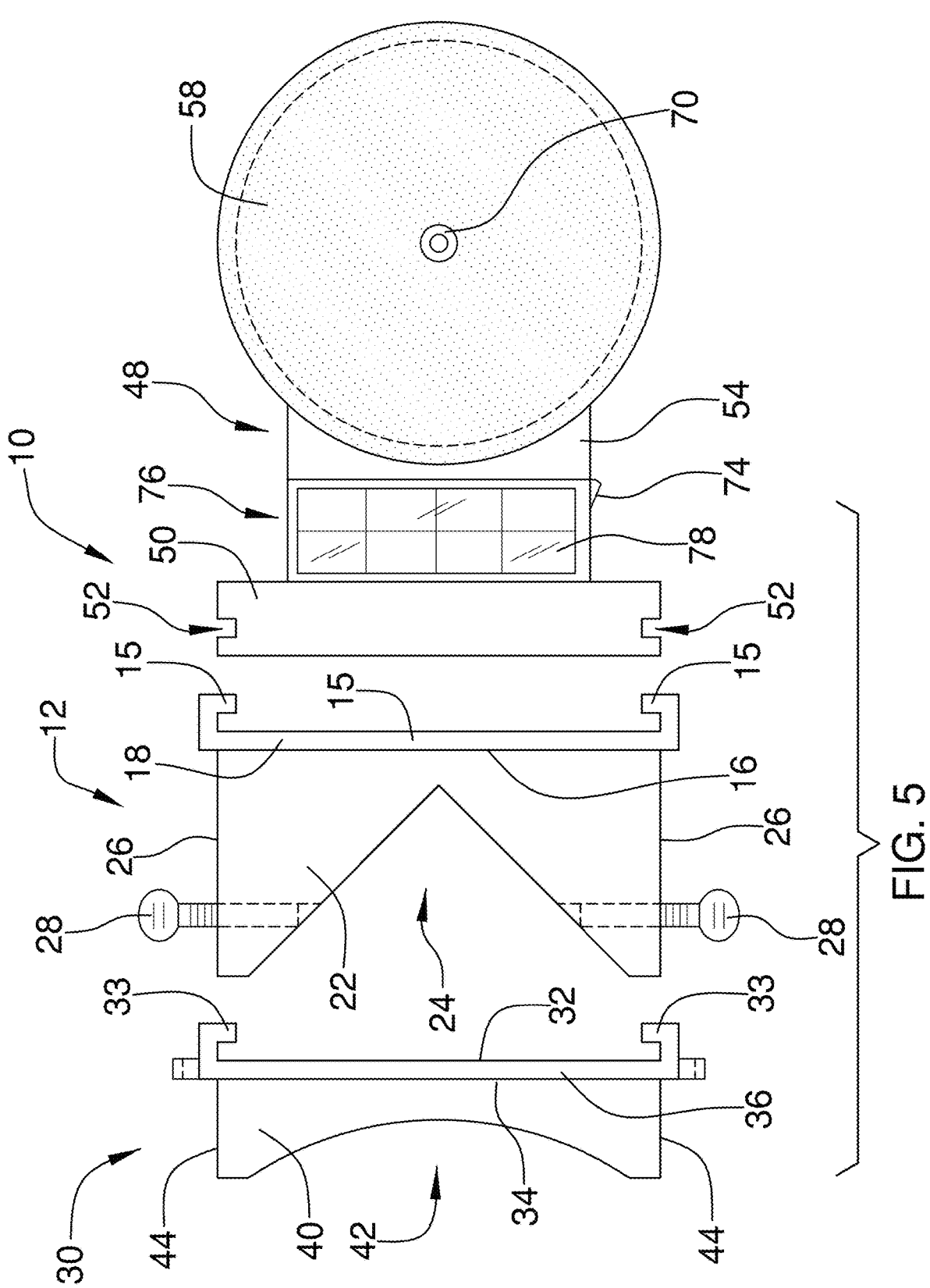
FIG. 5 is a top kit view of an embodiment of the disclosure.
Figure 6:
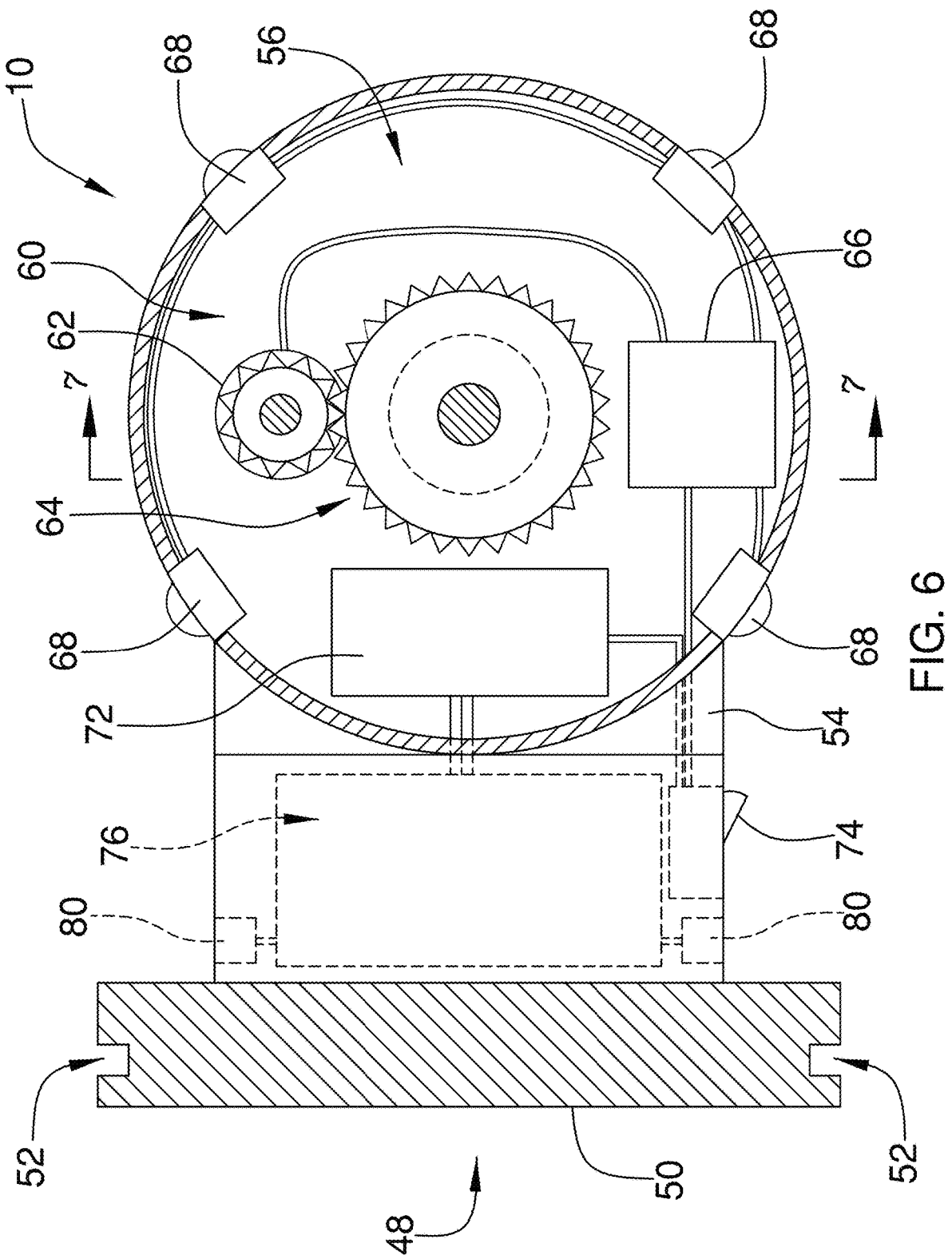
FIG. 6 is a cross-section view of an embodiment of the disclosure taken from Line 6-6 in FIG. 4.
Figure 7:
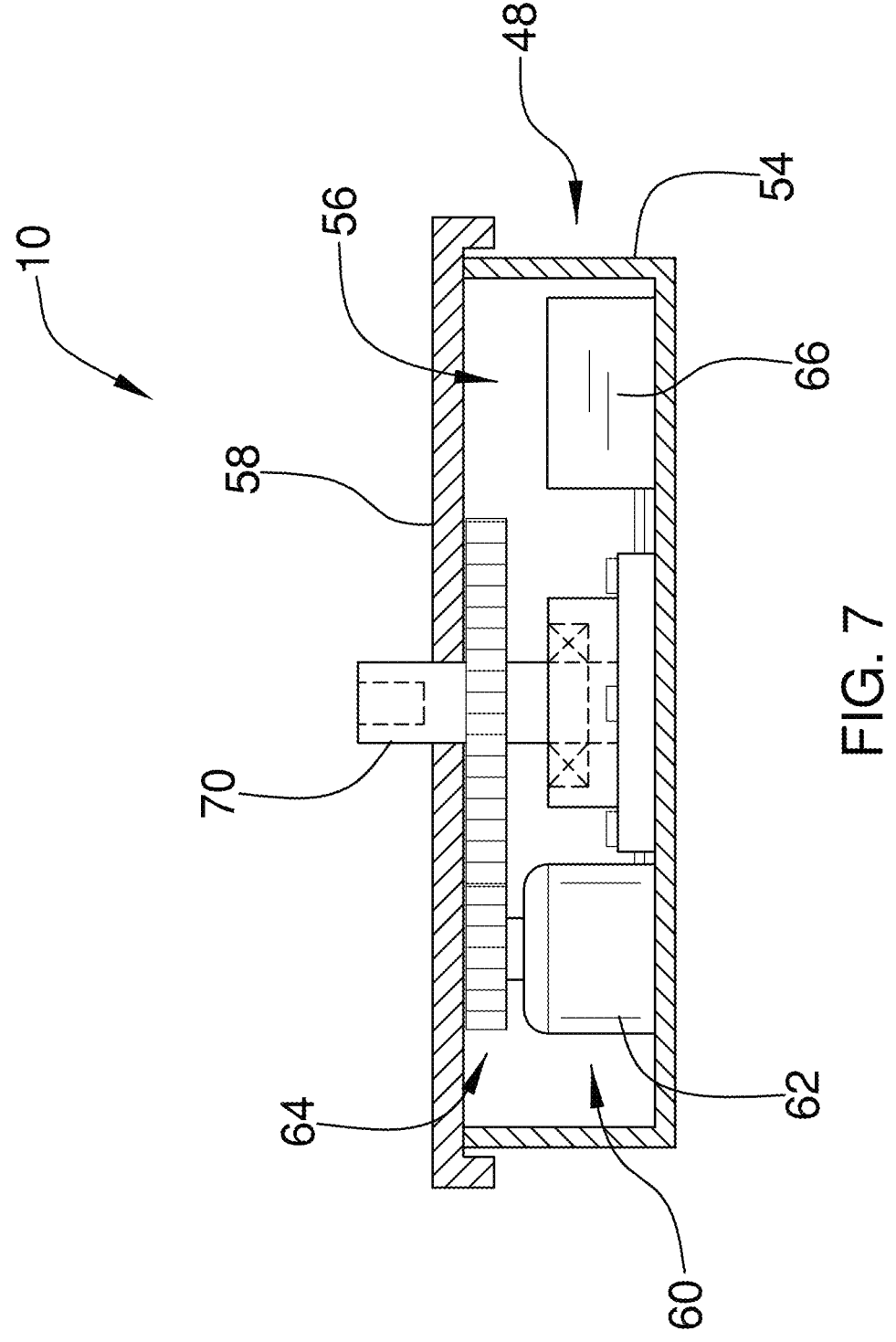
FIG. 7 is a cross-section view of an embodiment of the disclosure taken from Line 7-7 in FIG. 6.
Figure 8:
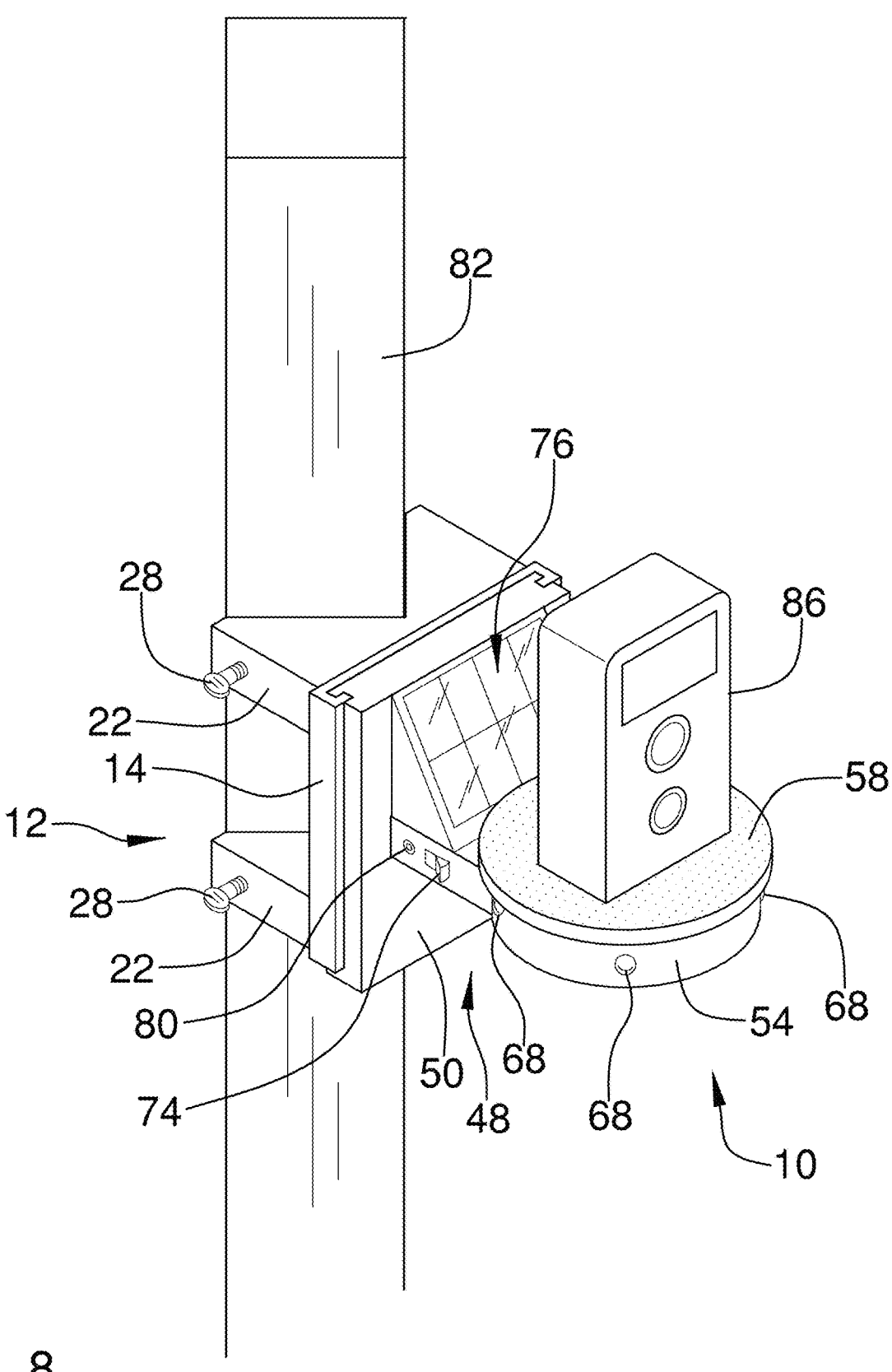
FIG. 8 is an in-use view of an embodiment of the disclosure.
Figure 9:
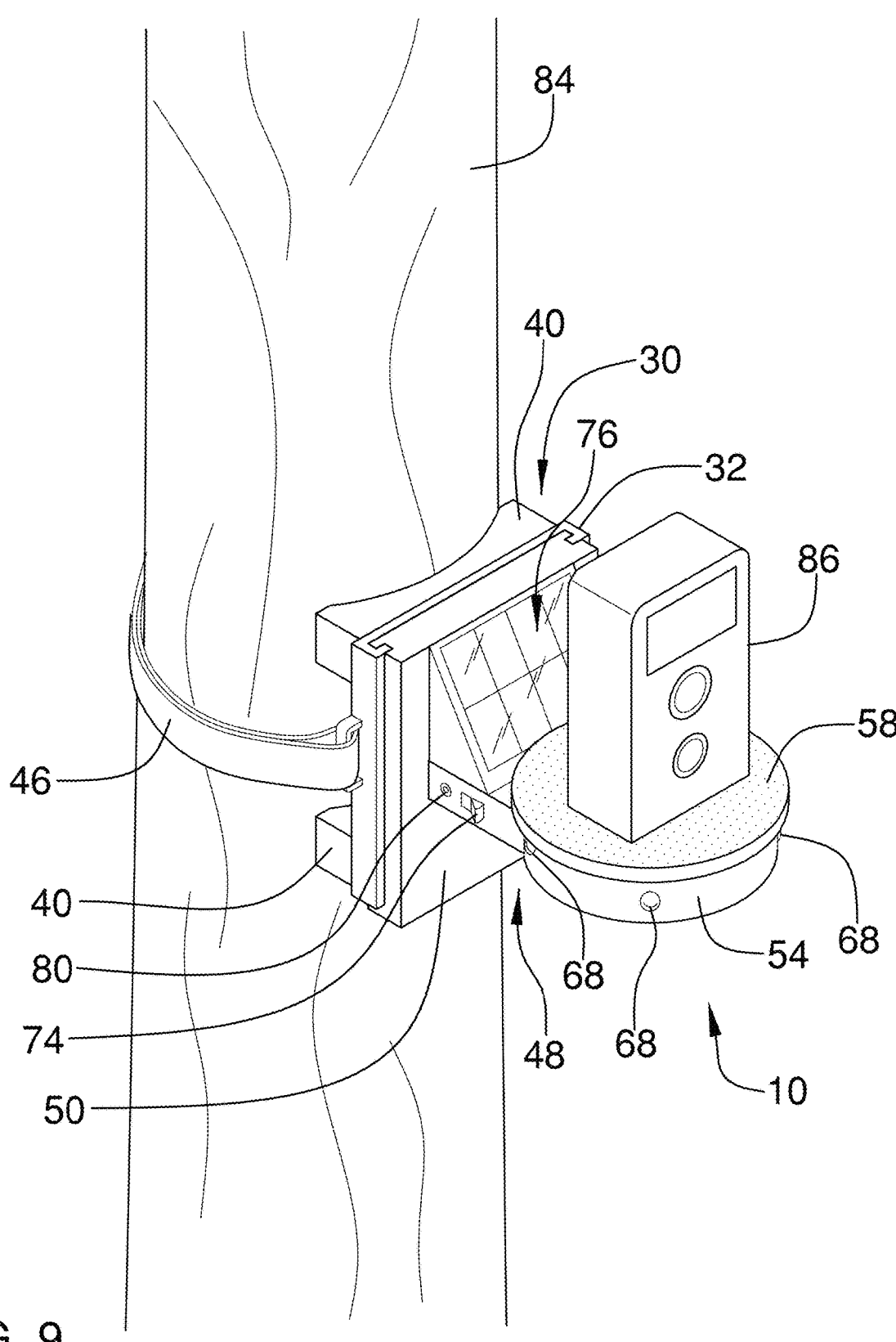
FIG. 9 is an in-use view of an embodiment of the disclosure.
Figure 10:
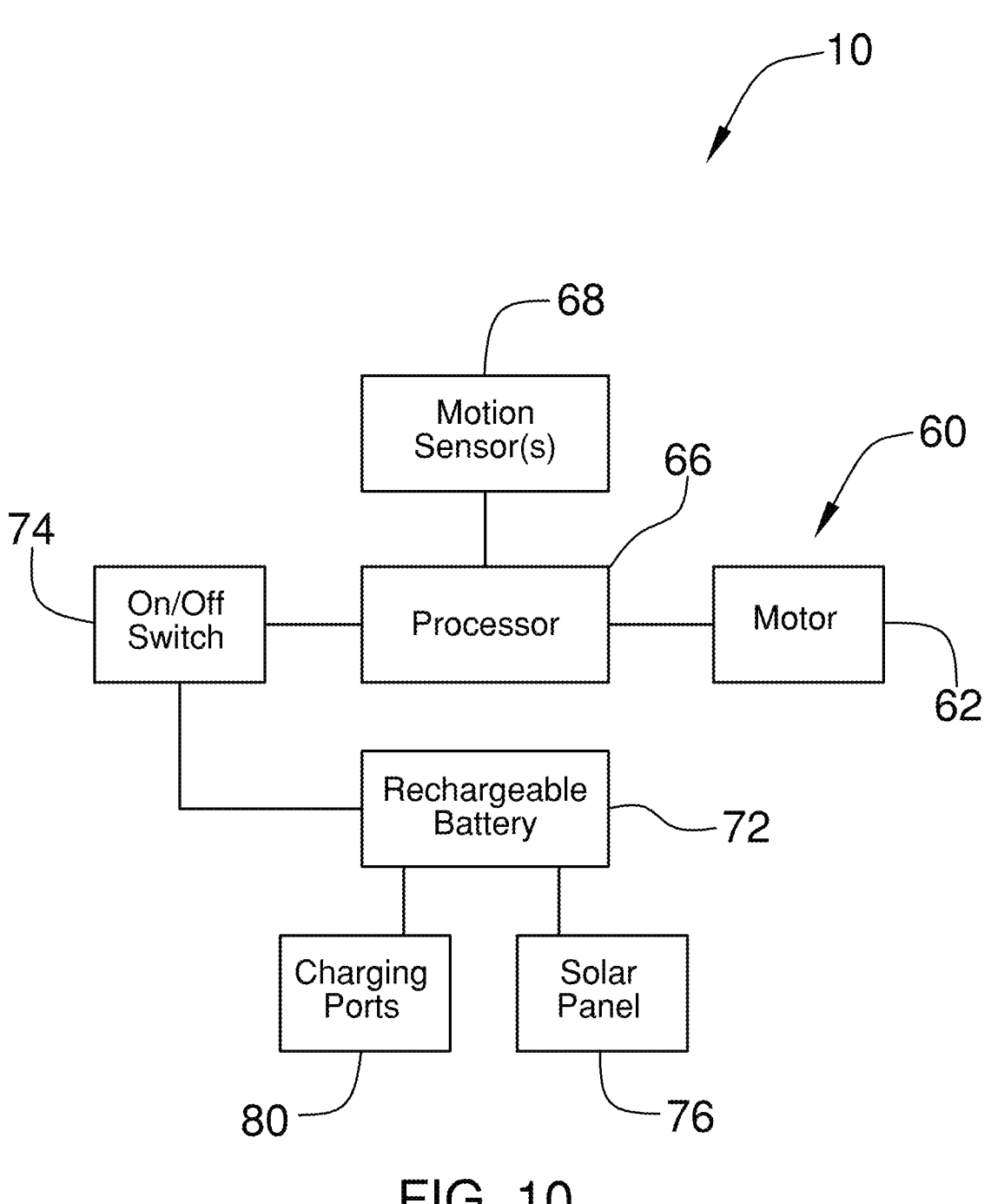
FIG. 10 is a block diagram of an embodiment of the disclosure.

With reference now to the drawings, and in particular to FIGS. 1 through 10 thereof, a new motion-sensing apparatus embodying the principles and concepts of an embodiment of the disclosure and generally designated by the reference numeral 10 will be described.

As best illustrated in FIGS. 1 through 10, the motion sensing mount apparatus 10 generally comprises a structure mounting bracket which is adapted to mount to a support structure. FIGS. 1, 2, 4, 5, and 8 show a first structure mounting bracket 12 which includes a front portion 14 and a pair of engagement portions 22. The engagement portions 22 are attached to a rear side 16 of the front portion 14 and is spaced away from each other between a top side 18 and a bottom side 20 of the front portion 14. Each engagement portion 22 defines a cavity 24 opposite the front portion 14 which has a V-shape. The first structure mounting bracket 12 may receive a corner of a building, a rectangular post 82, or similar structure into the cavities of the engagement portions 22 such that the interior surfaces of the engagement portions 22 conform to and abut the corner or similar structure. A plurality of threaded fasteners 28 insert through lateral sides 26 of the engagement portions 22. The threaded fasteners 28 may be turned to screw into the corner. The threaded fasteners 28 may engage internal threads of the first structure mounting bracket 12 to move alternately into and out of the cavity 24 when turned in a first rotational direction or second rotational direction respectively.

FIGS. 3 through 5 and 9 show a second structure mounting bracket 30 which also includes a front portion 32 and a pair of engagement portions 40. The engagement portions 40 are attached to a rear side 34 of the front portion 32 and is spaced away from each other between a top side 36 and a bottom side 38 of the front portion 32. Each engagement portion 40 defines a cavity 42 opposite the front portion 32 which has a curved shape. The curved shape may be circular, ovule, or the like. The cavities 42 of the engagement portions 40 of the second structure mounting bracket 30 are adapted to receiving a tree 84, a round pole, or similar structure such that interior surfaces of the engagement portions 40 conform to and abut a rounded surface of the tree 84 or similar structure. A strap 46 is attached to and extends between a pair of lateral sides 44 of the second structure mounting bracket 30. The strap 46 may be used to cinch the second structure mounting bracket 30 to the tree 84 or similar structure.

Either of the first and second structure mounting brackets 12, 30 may be used in an embodiment of the apparatus 10 or both may be provided as part of a kit. Other structure mounting brackets may be used which have surfaces which conform to a support structure and fasteners such as straps, threaded fasteners, hook-and-loop fasteners, nails, or other suitable fasteners to mount the structure mounting bracket to the support structure.

A support module 48 interchangeably mounts to the first and second structure mounting brackets 12, 30 at their front portions 14, 32 opposite the engagement portions. The support module 48 comprises a wall 50 which defines a pair of slots 52 which are positioned on opposite sides of the wall 50 from each other. The front portions 14, 32 have guide rails 15, 33 which insert into the slots 52 of the wall 50 to facilitate sliding of the wall 50 with respect to the front portions 14, 32. The support module 48 may be fixed with respect to the selected one of the first and second structure mounting brackets 12, 30 via friction, a seating engagement, fasteners such as latches, clamps, threaded fasteners or the like, or other suitable means. The support module 48 further comprises an overhang 54 which is coupled to and extends away from a front surface of the wall 50. The overhang 54 defines an interior space 56 therein.

A turntable 58 is rotatably mounted atop the overhang 54 and is configured for supporting a camera 86 thereon. The camera 86 may be a dedicated device or may be a part of a smartphone, tablet, or other device. A drive mechanism 60 is operatively coupled to the turntable 58. The drive mechanism 60 is positioned in the interior space 56 of the overhang 54. The drive mechanism 60 comprises a motor 62 and a geartrain 64, wherein the geartrain 64 operatively coupling the motor 62 to the turntable 58. Various actuators and power transmission components may be used in other embodiments, such as linear actuators, pulley-and-cable assemblies, and the like.

A processor 66 is mounted in the overhang 54 and is operatively coupled to the drive mechanism 60. A plurality of motion sensors 68 is mounted to an exterior of the overhang 54, and the motion sensors 68 are arranged radially with respect to a rotational axis of the turntable 58. Each motion sensor 68 of the plurality of motion sensors 68 faces away from the rotational axis. The processor 66 is programmed and configured to orient the camera 86 via the drive mechanism 60 in a direction where motion was detected via the plurality of motion sensors 68.

To determine a location where motion is detected with respect to the camera 86, the processor 66 may identify one or more of the motion sensors 68 which detects motion and determine the location to be in the direction in which the detecting motion sensors 68 face. In some embodiments, the camera 86 may be positioned in a calibrated manner with respect to the turntable 58 to facilitate facing the camera 86 toward desired locations based on rotating the turntable 58. The processor 66 also may execute instructions to compare images captured by the camera 86 with data taken from the motion sensors 68 to properly orient the camera 86 by rotating the turntable 58 in some embodiments.

A camera mount 70 is coupled to the turntable 58 and is configured to couple the camera 86 to the turntable 58 by inserting into the camera 86. In some embodiments, the camera mount 70 may be shaped and configured to fix the camera 86 with respect to the turntable 58 to accurately orient the camera 86 during use. The camera 86 may mount to the turntable 58 via clamps, threaded fasteners, magnets, hook-and-loop fasteners, latches, or the like in some embodiments.

A power supply 72 is mounted in the overhang 54 and is electrically coupled to the processor 66. The power supply 72 comprises a battery but may comprise a capacitor or other suitable power storage in other embodiments. A power switch 74 is electrically coupled to the power supply 72 and the processor 66 and is operable to electrically disconnect the processor 66 from the power supply 72. A solar panel 76 is electrically coupled to the power supply 72 and is mounted on the overhang 54 adjacent to the wall 50. The solar panel 76 has one or more solar cells 78 facing upwardly and forwardly with respect to the wall 50. Charging ports 80 are positioned on the exterior of the overhang 54 and are electrically coupled to the power supply 72. Cords may electrically couple the charging ports 80 to an external power source to charge the power supply 72.

In use, the support module 48 is mounted to the corner of the building, the rectangular post 82, the round pole, the tree 84, or the like. The camera 86 is mounted on the turntable 58 such as via the camera mount 70 or simply by placing the camera 86 atop the turntable 58. The power switch 74 is flipped to power the processor 66, which transfers power to and operates the drive mechanism 60 and the motion sensors 68. When the processor 66 detects motion and locates the motion with respect to the camera 86, the processor 66 operates the drive mechanism 60 to turn the turntable 58, thereby facing the camera 86 toward the location of the detected motion. The power supply 72 may be charged by the solar panel 76 or one of the charging ports 80.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motion sensing mount apparatus for use with a camera, the apparatus comprising:

a structure mounting bracket comprising a front portion and an engagement portion, the engagement portion being attached to a rear side of the front portion, the engagement portion defining a cavity opposite the front portion, the cavity being shaped and configured to conform to a support structure;

a connector configured to secure the structure mounting bracket to the support structure such that the support structure is positioned within the cavity of the engagement portion;

a support module mounted to the front portion of the structure mounting bracket;

a turntable rotatably mounted atop the support module, the turntable being configured for supporting the camera thereon;

a drive mechanism operatively coupled to the turntable;

a processor operatively coupled to the drive mechanism; and a motion sensor assembly mounted to the support module, the processor being configured to detect motion and a direction from which the motion originates relative to the turntable via the motion sensor assembly, the processor being programmed and configured to orient the camera via the drive mechanism in a direction where motion was detected via the motion sensor assembly.

2. The apparatus of claim 1, wherein the engagement portion is one of a pair of engagement portions, the pair of engagement portions being attached to the rear side of the front portion, the engagement portions being spaced away from each other between a top side and a bottom side of the front portion, each engagement portion of the pair of engagement portions defining a cavity opposite the front portion, the cavity of each engagement portion being shaped and configured to conform to the support structure.

3. The apparatus of claim 1, wherein the support module is removable from the structure mounting bracket.

4. The apparatus of claim 3, wherein the support module comprises:

a wall removably mounted to the front portion of the structure mounting bracket, the wall defining a pair of slots positioned on opposite sides of the wall from each other, the front portion of the structure having guide rails which insert into the slots of the wall to facilitate sliding of the wall with respect to the front portion; and an overhang coupled to and extending away from a front surface of the wall.

5. The apparatus of claim 1, wherein the drive mechanism comprises a motor and a geartrain, the geartrain operatively coupling the motor to the turntable.

6. The apparatus of claim 1, wherein the motion sensor assembly comprises a plurality of motion sensors mounted to the support module, the motion sensors being arranged radially with respect to a rotational axis of the turntable, each motion sensor of the plurality of motion sensors facing away from the rotational axis.

7. The apparatus of claim 1, further comprising a power supply electrically coupled to the processor.

8. The apparatus of claim 7, wherein the power supply comprises a battery.

9. The apparatus of claim 7, further comprising a power switch electrically coupled to the power supply and the processor, the power switch being operable to electrically disconnect the processor from the power supply.

10. The apparatus of claim 7, further comprising a solar panel electrically coupled to the power supply.

11. The apparatus of claim 7, further comprising a charging port electrically coupled to the power supply.

12. The apparatus of claim 1, further comprising a camera mount coupled to the turntable, the camera mount being configured to secure the camera to the turntable.

13. The apparatus of claim 12, wherein the camera mount comprises a post configured to insert into the camera to secure the camera to the turntable.

14. The apparatus of claim 1, wherein the cavity of the engagement portion of the structure mounting bracket has a V-shape.

15. The apparatus of claim 1, wherein the cavity of each engagement portion of the structure mounting bracket has a curved shape.

16. The apparatus of claim 1, wherein the connector is one of a plurality of connectors, each connector of the plurality of connectors comprising a threaded fastener, each threaded fastener extending through the engagement portion of the structure mounting bracket, the threads of each threaded fastener engaging the associated engagement portion such that the threaded fastener is movable alternately into and out of the cavity.

17. The apparatus of claim 1, wherein the connector comprises a strap which is attached to and extends between a pair of lateral sides of the structure mounting bracket.

18. A motion sensing mount apparatus for use with a camera, the apparatus comprising:

a structure mounting bracket comprising a front portion and a pair of engagement portions, the pair of engagement portions being attached to a rear side of the front portion, the engagement portions being spaced away from each other between a top side and a bottom side of the front portion, each engagement portion of the pair of engagement portions defining a cavity opposite the front portion, the cavity of each engagement portion being shaped and configured to conform to a support structure;

a connector configured to secure the structure mounting bracket to the support structure such that the support structure is positioned within the cavities of the engagement portions;

a support module mounted to the front portion of the structure mounting bracket, the support module being removable from the structure mounting bracket, the support module comprising:

a wall removably mounted to the front portion of the structure mounting bracket, the wall defining a pair of slots positioned on opposite sides of the wall from each other, the front portion of the structure having guide rails which insert into the slots of the wall to facilitate sliding of the wall with respect to the front portion; and an overhang coupled to and extending away from a front surface of the wall, the overhang defining an interior space therein;

a turntable rotatably mounted atop the overhang, the turntable being configured for supporting the camera thereon;

a drive mechanism operatively coupled to the turntable, the drive mechanism being positioned in the interior space of the overhang, the drive mechanism comprising a motor and a geartrain, the geartrain operatively coupling the motor to the turntable;

a processor operatively coupled to the drive mechanism;

a plurality of motion sensors mounted to an exterior of the overhang, the motion sensors being arranged radially with respect to a rotational axis of the turntable, each motion sensor of the plurality of motion sensors facing away from the rotational axis, the processor being programmed and configured to orient the camera via the drive mechanism in a direction where motion was detected via the plurality of motion sensors;

a power supply electrically coupled to the processor, the power supply being mounted in the overhang, the power supply comprising a battery;

a power switch electrically coupled to the power supply and the processor, the power switch being operable to electrically disconnect the processor from the power supply;

a solar panel electrically coupled to the power supply, the solar panel being mounted on the overhang adjacent to the wall, the solar panel having one or more solar cells facing upwardly and forwardly with respect to the wall;

a charging port electrically coupled to the power supply, the charging port being positioned on the exterior of the overhang; and a camera mount coupled to the turntable, the camera mount comprising a post configured to insert into the camera to secure the camera to the turntable.

19. The apparatus of claim 18, wherein:

the cavity of each engagement portion of the structure mounting bracket has a V-shape; and the connector is one of a plurality of connectors, each connector of the plurality of connectors comprising a threaded fastener, each threaded fastener extending through an associated one of the pair of engagement portions of the structure mounting bracket, the threads of each threaded fastener engaging the associated engagement portion such that the threaded fastener is movable alternately into and out of the cavity.

20. The apparatus of claim 18, wherein:

the cavity of each engagement portion of the structure mounting bracket has a curved shape; and the connector comprises a strap which is attached to and extends between a pair of lateral sides of the structure mounting bracket.

\* \* \* \* \*